Feb. 4, 1958　　　T. K. FRANKE　　　2,821,854
VEHICLE SCALE FOR LIQUEFIED GAS DISPENSER
Filed Sept. 29, 1952

Theodore K. Franke
INVENTOR.

BY J. Vincent Martin
Joe E. Edwards
B. R. Pravel
ATTORNEYS

United States Patent Office 2,821,854
Patented Feb. 4, 1958

2,821,854

VEHICLE SCALE FOR LIQUEFIED GAS DISPENSER

Theodore K. Franke, El Campo, Tex.

Application September 29, 1952, Serial No. 312,020

5 Claims. (Cl. 73—296)

This invention relates to new and useful improvements in dispensing devices for dispensing measured amounts of liquids having high vapor pressures such as liquefied gas maintained under superatmospheric pressure, and more particularly, for dispensing measured amounts of liquid anhydrous ammonia, from a vehicle.

It is common practice to supply liquefied gas, and particularly liquid anhydrous ammonia to the users thereof in bottles or similar containers having various standard amounts such as one-hundred and two-hundred pound sizes. The storage tanks of the users of liquefied gas must be filled until the liquid level in the storage tank reaches the required amount. Since it is difficult to estimate how many pounds of liquefied gas will be necessary to fill the tank to the required level, it is necessary for the user to purchase extra bottles to be assured of having an adequate supply of the liquefied gas. Furthermore, not only must the user handle a number of these bottles to fill his main reservoir or storage tank with the attendant disadvantages thereof, but the supplier must handle a large number of these bottles in the transportation and filling of them. The expense and inconvenience involved in the use of such bottles for handling these liquefied gases, such as ammonia, is therefore considerable.

Also, so far as is known, there is no satisfactory metering device in existence for measuring the flow of liquefied gases. This is apparently due to the pronounced effect of temperature and pressure on such liquefied gases.

It is therefore an object of this invention to provide a dispensing device for dispensing measured amounts of liquefied gases under superatmospheric pressure, such as liquefied ammonia, directly from a supply vehicle to the storage tank of the user, thereby enabling the delivery of the exact amount of liquefied gas needed by the user as well as eliminating the difficulties and expense of handling the usual bottles or containers of liquefied gas.

It is an important object of this invention to provide a dispensing device for dispensing measured amounts of liquefied gas, such as liquid anhydrous ammonia, wherein said device includes a measuring tank mounted on a vehicle, a weighing scale associated with said tank for determining the weight of the liquefied gas in the tank during filling and dispensing therefrom, and means to support said tank during transit of said vehicle to render said weighing scale inactive to thereby prevent damage to the scale during transit of said vehicle.

Another object of this invention is to provide a dispensing device for dispensing measured amounts of liquefied gas wherein a measuring tank is supported on a weighing scale attached to a bulk tank of a transport vehicle whereby liquefied gas from the bulk tank may be measured into and dispensed from said measuring tank in known, weighed amounts indicated by said weighing scale, said bulk tank having a support means for said measuring tank to hold same fixed with respect to said bulk tank and to remove the weight of the weighing tank from the weighing scales.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an elevational view of the dispensing device of this invention, wherein a measuring tank is supported in connection with a bulk tank of a transport vehicle.

Figure 2 is an end elevational view of the support means for the measuring tank shown in Figure 1, illustrating the particular connection to the bulk tank.

In the drawings, the letter M designates the measuring tank, which is adapted to measure and dispense liquefied gas, such as liquid anhydrous ammonia in desired weighed quantities. This tank M is normally suspended or supported by a weighing scale S so that the weight of the liquefied gas within the measuring tank M can constantly be determined. In order to render the scales S inactive and to relieve the weight of the measuring tank M and its contents, as well as to maintain the measuring tank M in a fixed position during transit of the vehicle upon which it is mounted, a support means designated by the letter A is utilized. Thus, when the measuring tank M is supported by the support means A, the scale S can no longer perform its weighing function, and the strain or weight of the measuring tank M and its contents are no longer imposed upon the weighing scale S. This prevents damage to the weighing scale S during transit of the equipment on the vehicle upon which this dispensing device is mounted.

Referring to Figures 1 and 2, therein is shown a bulk tank 10, partially illustrated, which is of the usual type for transporting liquefied gases under superatmospheric pressure, and particularly liquid anhydrous ammonia under superatmospheric pressure. This bulk tank 10 is, of course, mounted upon wheels such as indicated partially at 11, with the front end of the tank 10 being connected to a truck cab or similar vehicle for pulling the tank 10 from the point of manufacture or supply of liquefied gas to the user thereof. It will be appreciated that the bulk tank 10 is very large as compared to the size of the measuring tank M which is mounted therewith.

As shown in Figures 1 and 2, the weighing scale S is illustrated as including a pair of conventional weighing scales, although it will be evident that only one scale could be used. Each weighing scale is supported from an end bracket or plate 12, which is welded at 13 to the outer surface of the bulk tank 10, or otherwise suitably affixed thereto. An inner support plate 14 is similarly welded or secured to the outer surface of the tank 10, whereby a transverse or horizontal bar 15 may be secured to the plates 12 and 14 by bolts or screws such as 16 and 17, respectively. From the fixed bar 15 there is suspended the usual weighing scale which includes a pair of weighing or graduated arms 18 and 19, which are pivotally suspended in the known manner. As shown in the drawings, the arm 18 is pivoted from a fixed extension length 20 while the arm 19 is pivoted on link 21, with the arms 18 and 19 being pivotally connected together by a chain or link 22. Suitable, movable weights 23 and 24 are provided on the graduated arms 18 and 19, respectively, with the upper arm 18 indicating the weight in hundredths of pound, while the arm 19 indicates the weight in fractions of one hundred pounds. An initial counter balance weight 25 may be provided to balance the weight of the empty tank M so that the scale will read zero or other figure when the tank is empty, which figure is the tare weight which is known and is subtracted from the gross weight to determine the weight of the liquefied gas in the tank M.

The measuring tank M has connected to each end thereof an extensible means such as a chain or linkage 27, which is pivotally secured to the lower arm 19 inside of the pivot to which the link 21 is connected. Since two weighing scales are employed, and the measuring tank M is suspended from its opposite ends, each scale will weigh ½ of the contents of the measuring tank M. This particular construction therefore enables the suspension of the tank M in a horizontal position with respect to the ground, and therefore makes it possible to carry the measuring tank on the side of the bulk tank 10. It would be appreciated that if the measuring tank M had to be carried in a vertical position it would, in most instances, be too large to be carried without dragging the ground or extending too far beyond the normal width of the vehicle or the wheels 11 on which the tank 10 is mounted. However, by being suspended horizontally, the tank M can be carried sufficiently low on the bulk tank 10 to be conformed with the width of the wheels 11, so that there is some protection offered to the tank M, and the usual width of the transport tank is not extended beyond the usual limits of the wheels 11.

As shown in Figure 2 particularly, the supporting means A includes a pair of relatively flexible metal bands 31. Each band has one end thereof pivotally connected to a bracket 30 at the pivot 32. The bracket 30 is welded to the outer surface of the tank 10 or otherwise suitably affixed. The inner surface of the bracket 30 is shown at 30a and is an arcuate surface which corresponds with the curvature of the bulk tank M. The flexible bands 31 are also suitably curved to the curvature of the measuring tank M and the free end of each band 31 is designated as 31a. This free end 41a has an opening therein through which a bolt 33 can extend. One end of the bolt 33 is pivoted to the bracket 30 at hook 34, while the other end is threaded to receive the nut 35. When the bands 31 are disposed around the measuring tank M and a nut 35 is threaded on each bolt 33 to force the bands 31 into tight engagement with the outer surface of the measuring tank M, the tank M is held rigidly and fixed with a respect to the bulk tank 10. Also, when the tank M is held in such fixed position by the bands 31, the links 27 are not under tension and the weight of the tank and its contents are not carried by the weighing scale S. Thus it can be seen that the tank M is actually held in a raised and supported position by the bands 31 during transit. When it is desired to dispense and measure the liquefied gas from the measuring tank M to the users' reservoir or storage tanks, it is only necessary to loosen the nuts 35 until the weight of the tank M is suspended from the links 27. Such loosening of the nuts 35 is preferably done with a crank wrench and ordinarily it is not necessary to thread the nuts 35 off the bolts 33, but only sufficient threading is necessary to transfer the weight of the tank M to the links 27. Thereafter the bolts 33 can be slipped off the hooks 34 of the brackets 30 to drop the bands 31.

It will be observed that the measuring tank M has a flexible filling line 40 which leads from the bulk tank 10, and which may be controlled by a valve 41 in such line. Also, at the top of the measuring tank M or any other suitable place, an outlet line 42 is provided with suitable valves (not shown) to feed the liquefied gas from the measuring tank M into the user's storage tanks. The pressure in the measuring tank M can be checked by the pressure gauge 43 mounted thereon.

In the operation or use of the dispensing device shown in Figures 1 and 2 the liquefied gas, such as liquid anhydrous ammonia, is admitted from the bulk tank 10 into the measuring tank M until a suitable pressure and weight have been obtained in the measuring tank M. Then the valve 41 supplying the liquefied gas to the measuring tank M is closed and the weight of the tank is obtained on the weighing scales S. Thereafter, the outlet line 42 on the measuring tank M is connected to the user's storage tanks by a hose and other conventional equipment, and the storage tank of the user is filled until the level in the glass tube indicator or liquid level gauge indicates that the tank of the user is full or at the desired amount. When that occurs, the weight of the measuring tank M is again checked and the difference between the initial weight before filling the storage tank and after it has been filled, will indicate the weight of the liquefied gas which has been delivered to the user. Of course, it may be necessary to repeat the filling of the measuring tank M if the storage tank of the user is very large or if several storage tanks are to be filled. Thus, it can be seen, that the construction of this invention enables the filling of the user's storage tanks with the liquefied gas with the exact amount of liquefied gas necessary, and without the necessity for handling cumbersome bottles. Also, it is evident that the filing is accomplished by connecting the tank M to the user's tanks only one time whereas with bottles numerous connections and reconnections are required to add the same amount of liquefied gas to the user's system.

Thus it can be seen that with this invention the use of bottles and other complicated weighing structure at the source of the user of the liquefied gas has been eliminated, and a device has been provided for dispensing liquefied gas which can be supported during the transit of the vehicle carrying such gas without danger to the scales during transit. Also, it will be evident that the dispensing device of this invention provides a construction wherein the measuring tank M can be suspended horizontally from a pair of weighing scales, whereby the measuring tank M can be carried without providing or causing an obstruction beyond the usual limits of the trucks.

The foregoing disclosure and description of the invention is illustrative and explanatory thereof, and various changes in the size, shape and materials, as well as in the details of the illustrated construction may be made, within the scope of the appendant claims, without the parting from the spirit of the invention.

What is claimed is:

1. In a liquefied gas dispensing device, the combination with a vehicle of, a weighing scale mounted on the vehicle, a measuring tank, an extensible connecting means for imposing the weight of said measuring tank and its contents on said scale whereby the amount of liquefied gas in said measuring tank is indicated, and releasable strap means for removing the weight of said measuring tank from said scale without disconnecting said measuring tank from said scale.

2. The device set forth in claim 1, wherein said weighing scale is disposed above said measuring tank, and said connecting means includes a flexible member.

3. A dispensing device for dispensing liquefied gas from a vehicle having a supply of said gas in a bulk tank, comprising, a measuring tank, a weighing scale mounted on the vehicle, means for imposing the weight of the measuring tank upon said scale whereby said measuring tank and its contents may be weighed to indicate the amount of said gas dispensed therefrom, and means for supporting said measuring tank independently of said scale to remove the weight of the measuring tank and its contents from said scale, said means including a clamping band adapted to fit around said measuring tank, a pivot on one end of said band pivotally connecting said band to said vehicle, and means on the other end of said band for releasably connecting said other end of the band to said vehicle.

4. A dispensing device for dispensing liquefied gas from a vehicle comprising, a vehicle chassis, having a set of rear wheels, a generally cylindrical bulk tank for liquefied gases disposed on its side on the chassis, a weighing scale mounted on the side of the bulk tank, a measuring tank connected to the bulk tank by a flexible hose connection, means for imposing the weight of the measuring tank upon said scale whereby said measuring tank and its contents may be weighed to indicate the amount of gas dispensed therefrom, and means for selectively supporting said measuring tank independently of said scale to remove the weight of the measuring tank from the scale and for firmly securing the measuring tank to the bulk tank below a horizontal diametrical plane through the bulk tank and inboard of the outermost extremity of said set of wheels.

5. A dispensing device for dispensing liquefied gas from a vehicle having a supply of said gas in a bulk tank, comprising, a measuring tank, a weighing scale mounted on the vehicle, means for imposing the weight of the measuring tank upon said scale whereby said measuring tank and its contents may be weighed to indicate the amount of said gas dispensed therefrom, and means for supporting said measuring tank independently of said scale to remove the weight of the measuring tank and its contents from said scale, said means for supporting said measuring tank anchoring the measuring tank to the bulk tank and holding the two tanks in fixed position relative to each other to permit loading of the vehicle with the measuring tank connected thereto.

References Cited in the file of this patent

UNITED STATES PATENTS

| | | |
|---|---|---|
| 1,165,714 | Ruckes | Dec. 28, 1915 |
| 1,201,819 | Hald | Oct. 17, 1916 |
| 1,587,912 | Lipps et al. | June 8, 1926 |
| 1,833,576 | Jaenichen | Nov. 24, 1931 |
| 1,897,171 | Lewis | Feb. 14, 1933 |
| 2,271,434 | Johnson | Jan. 27, 1942 |
| 2,356,440 | Baumgard | Aug. 22, 1944 |
| 2,384,677 | Hill | Sept. 11, 1945 |
| 2,544,734 | St. Clair | Mar. 13, 1951 |

FOREIGN PATENTS

| | | |
|---|---|---|
| 643,588 | Great Britain | Sept. 20, 1950 |
| 88,465 | France | Jan. 7, 1870 |
| 426,031 | Great Britain | Mar. 26, 1935 |
| 683,053 | Germany | Oct. 28, 1939 |